Patented Mar. 7, 1950

2,499,392

UNITED STATES PATENT OFFICE 2,499,392

ESTERS OF α-ACYLOXY ACRYLIC ACIDS

William O. Kenyon and Cornelius C. Unruh, Rochester, N. Y., assignors to Eastman Kodak Company, Rochester, N. Y., a corporation of New Jersey No Drawing. Application September 19, 1947, Serial No. 775,144

7 Claims. (Cl. 260—484)

This invention relates to a process for preparing esters of α-acyloxyacrylic acids.

Spence and Degering in U. S. Patent 2,407,302, dated September 10, 1946, have shown that esters of α-acyloxyacrylic acids may be prepared by reacting a ketone with a ketoester, such as ethyl pyruvate. However, a reaction mixture which is difficult to separate into its component parts usually results. The products prepared from a ketone and a ketoester are obtained in low yields, and are homopolymerized with extreme difficulty. In contradistinction thereto, the products obtained according to the process of the present invention are obtained in excellent yield and may be homopolymerized without difficulty.

It is, therefore, an object of this invention to provide a process for preparing esters of α-acyloxyacrylic acids.

A further object of this invention is to provide a process for preparing esters of α-acyloxyacrylic acids in increased yields and in condition suitable for polymerizing.

A further object of this invention is to provide valuable new intermediates which may be used in the preparation of esters of α-acyloxyacrylic acids. Other objects will hereinafter become apparent from a consideration of the following description.

According to the process of the present invention, we react an α-acyloxyacrylonitrile with an anhydrous hydrogen halide and an alcohol, producing the hydrohalide of an α-acyloxy-β-halopropionoimino ether, which can be hydrolyzed to the corresponding β-halo-ester by addition of water. This ester is then dehydrohalogenated to the desired α-acyloxyacrylic ester by treatment with an organic tertiary amine.

The α-acyloxyacrylonitriles which we may advantageously use may be represented by the formula:

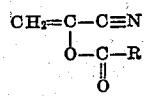

wherein R represents an alkyl group, such as methyl, ethyl, propyl, isopropyl (i. e., an alkyl group having the formula $C_nH_{2n+1}$ where $n$ is a positive integer from 1 to 3). Typical are α-acetoxyacrylonitrile, α-butyroxyacrylonitrile, and α-isobutyroxyacrylonitrile.

The alcohols which we may use may be represented by the formula:

wherein $R_1$ represents a member selected from the group consisting of an alkyl group, such as methyl, ethyl, propyl, isopropyl, n-butyl, isobutyl, secondary and tertiary butyl, amyl, isoamyl, n-hexyl, isohexyl, 2-ethylbutyl, n-heptyl, n-octyl, 2-ethylhexyl (i. e., an alkyl group having the formula $C_nH_{2n+1}$ where $n$ is a positive integer from 1 to 8), and an aralkyl group, such as benzyl, β-phenylethyl, β-phenylpropyl, β-phenylbutyl (i. e., an aralkyl group containing a mononuclear aryl group of the benzene series, having 7 to 10 carbon atoms). Typical are methyl alcohol, ethyl alcohol, propyl alcohol, isopropyl alcohol, n-butyl alcohol, isobutyl alcohol, secondary and tertiary butyl alcohols, n-amyl alcohol, isoamyl alcohol, n-hexyl alcohol, isohexyl alcohol, 2-ethylbutyl alcohol, n-heptyl alcohol, n-octyl alcohol, 2-ethylhexyl alcohol, benzyl alcohol, β-phenylethyl alcohol, β-phenylpropyl alcohol, and β-phenylbutyl alcohol, etc.

The hydrogen halides which we can use can be represented by the formula:

where X is a halogen atom, such as chlorine, bromine, and fluorine. These hydrogen halides must all be used in substantially anhydrous form, preferably in the form of a gas.

The mechanism of the reaction may be represented as follows:

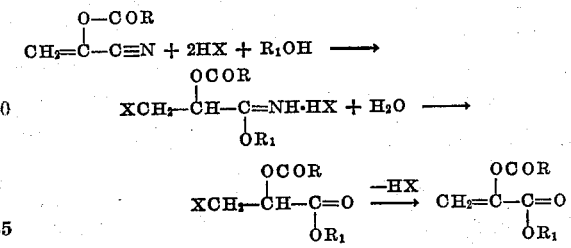

where R, $R_1$, and X have the above-designated definitions.

Alternatively, in lieu of starting with an acyloxyacrylonitrile, it is possible to start with a nitrile represented by the formula:

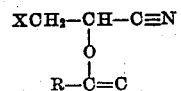

where R and X have the definition set forth above. The nitriles represented by the above formula can be prepared by the addition of one mol. of hydrogen halide to one mol. of an α-acyloxyacrylonitrile according to the equation:

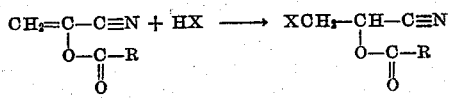

The α-acyloxy-β-halopropiononitrile can then be reacted with additional anhydrous hydrogen halide and an alcohol without separation from the crude reaction mixture.

Another alternative procedure is to react the

α-acyloxyacrylonitrile or α-acyloxy-β-halopropionitrile with anhydrous HX to produce the imino-halide:

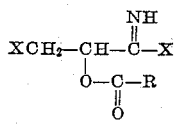

and react this imino-halide with the alcohol to produce the imino-ether hydrohalide:

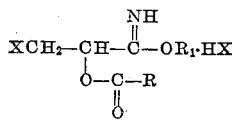

The reactants are generally employed in substantially stoichemetric quantities. However, it may be advantageous to use an excess of nitrile, since the nitriles are excellent solvents for the reaction and tend to minimize the effects of the corrosive hydrogen halide gases. Solvents may likewise be employed to advantage in our process. Representative solvents are the halogenated hydrocarbons boiling above 10° C., e. g., ethylene dichloride, chloroform, carbon tetrachloride, etc., aromatic hydrocarbons such as benzene, toluene, xylene, etc., diethyl ether, diisopropyl ether, the cyclic ethers such as dioxane, etc.

Due to the exothermic nature of the reaction of the hydrogen halide with the nitrile, it is advantageous to employ artificial cooling means while the hydrogen halide gas is being passed into the reaction vessel. During the addition of the hydrogen halide the temperature of the reaction vessel is maintained approximately at 0-20° C. to avoid decomposition of the unstable imino-ether hydrohalide. Solvents provide for more efficient temperature control, and, therefore, it is generally preferred to use a solvent whenever possible. The solvent need not be added all at once, but can be gradually added over the period of the addition of the hydrogen halide, to absorb the heat of reaction and agitate the contents of the reaction vessel.

The hydrolysis of the imino-ether hydrohalide can be accomplished easily by addition of water and gentle warming of the resulting solution. The α-acyloxy-β-halopropionate usually separates out as an oil and can be purified by vacuum distillation.

The tertiary amines which we can advantageously use are the aliphatic tertiary amines, each as trimethyl amine, triethyl amine, tripropylamine, tributyl amine; the aromatic amines, such as N,N-dimethyl aniline, N,N-diethyl aniline; and heterocyclic amines, such as pyridine, quinoline, etc. Other organic tertiary amines can be likewise used without difficulty.

The following examples will serve to characterize our invention further:

*Example 1.—Ethyl-α-acetoxyacrylate*

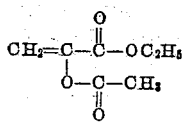

184 grams of absolute ethyl alcohol are dissolved in 2 liters of isopropyl ether, and the vessel containing the solution immersed in an ice bath. Anhydrous hydrogen chloride is bubbled through the solution until the vessel has gained 407 grams in weight. Thereupon, 444 grams of α-acetoxyacrylonitrile are added, and the temperature of the contents of the vessel allowed to rise to that of the room. When the temperature of the mixture rises above that of the room, the contents are again cooled by immersion in the ice bath. After standing at room temperature for four hours a copious, crystalline precipitate of α-acetoxy-β-chloropropionoimino ethyl ether hydrochloride has formed, and is then filtered off and dried at room temperature. After drying, 400 grams of the ether:

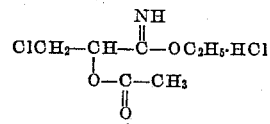

are obtained. Distilled water (800 grams) is then added and the solution warmed gently on a water bath. After a few minutes a colorless oil separates out from the aqueous medium, which is decanted off. The oil is then washed several times with water, and dried. Upon distillation of the oil in a rectifying column, 195 grams of ethyl-α-acetoxy-β-chloropropionate, boiling at 97.5 to 98.0° C. at 5 mm. and having the formula:

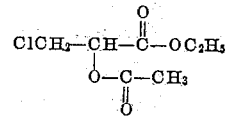

are obtained. This ester is then dissolved in 200 grams of quinoline and 1000 cc. of dry, thiophene-free benzene. The resulting solution is then stirred under reflux for 20 hours, and the benzene solution concentrated by boiling. After concentration of the residual oil under vacuum, a 94% yield (149 grams) of ethyl-α-acetoxyacrylate, boiling at 84–85° C. at 15 mm., is obtained. The product is then purified by dissolving in thiophene-free benzene and washing with ice-cold 2% sulfuric acid, followed by washings with cold water and cold 2% sodium carbonate solution. The benzene layer is then dried, and the benzene layer concentrated. The residual oil is then fractionated under vacuum. Upon polymerization of the monomer with benzoyl peroxide, a hard, clear and colorless tough polymer is obtained.

| Analysis | Calculated | Found | |
|---|---|---|---|
| | | Monomer | Polymer |
| C | 53.16 | 52.49 | 53.51 |
| H | 6.32 | 6.37 | 6.54 |

When 435 grams of anhydrous benzyl alcohol replace 184 grams of absolute ethyl alcohol in the above example, benzyl-α-acetoxyacrylate having the formula:

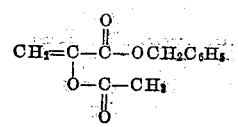

is obtained in 85–90% yield.

*Example 2.—Ethyl-α-butyroxyacrylate*

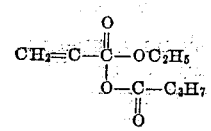

In the manner described above in Example 1, 184 grams of absolute ethyl alcohol are dissolved in 2 liters of isopropyl ether, and the vessel containing the solution immersed in an ice-bath. Anhydrous hydrogen chloride is then passed into the solution until the vessel has gained 407 grams in weight. Thereupon, 556 grams of α-butyroxy-acrylonitrile are added, and the temperature of the contents of the vessel allowed to come to room temperature. While maintaining the temperature of the solution at 20–25° C., the solution is allowed to stand for 4–4½ hours, during which time a voluminous precipitate of α-butyroxy-β-chloropropionoimino ethyl ether hydrochloride forms. After separation of the precipitate from the solution, 800 grams of distilled water are added, and the solution warmed gently on a water bath. After a few minutes a colorless oil separates out, which is well washed with water, and then dried. Distillation of the oil in a rectifying column gives ethyl-α-butyroxy-β-chloropropionate boiling at 113 to 114° C. at 7 mm., and having the formula:

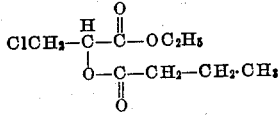

This ester is then dissolved in 200 grams of quinoline and 1000 cc. of thiophene-free benzene. The solution is then stirred under reflux for 20 hours, and the benzene solution concentrated by boiling. After concentration of the residual oil under vacuum, ethyl-α-butyroxyacrylate is obtained, boiling at 95–96° C. at 11 mm. The ester can be further purified by dissolving in thiophene-free benzene, washing with water and cold 2% sulfuric acid, followed by a washing with cold 2% sodium carbonate solution. The benzene can then be evaporated off, and the ester fractionally distilled.

Butyl-α-propionoxyacrylate can be similarly prepared by substituting butyl alcohol for the ethyl alcohol and α-propionoxyacrylonitrile used in the above example. Its formula can be represented as:

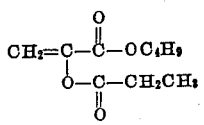

Other esters of α-acyloxyacrylic acids can be prepared in accordance with the above examples. The tertiary amines employed can be recovered and used over again, if so desired. The process of the present invention is particularly advantageous in that esters in exceptionally pure form may be prepared in excellent yields, and the esters so prepared can either be homopolymerized or copolymerized with other polymerizable compounds without difficulty.

We claim:

1. A process for preparing an ester of an α-acyloxyacrylic acid which comprises reacting a nitrile having the formula:

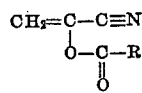

wherein R is an alkyl group having 1 to 3 carbon atoms with an alcohol having the formula:

R₁—OH wherein R₁ is a member selected from the group consisting of an alkyl group having the formula $C_nH_{2n+1}$ wherein $n$ is a positive integer of from 1 to 8, and a mononuclear aralkyl group of the benzene series having from 7 to 10 carbon atoms, in the presence of an anhydrous acid having the formula:

HX where X is a halogen atom, selected from the group consisting of chlorine, bromine, and fluorine atoms, to produce an imino-ether hydrohalide having the formula:

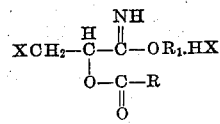

wherein R, R₁, and X have the above designated definitions, thereafter adding water to produce an ester having the formula:

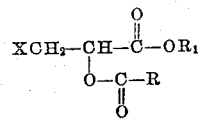

adding a tertiary amine and refluxing the solution to produce an ester having the formula:

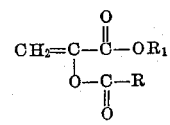

wherein R and R₁ have the above-designated definitions, and separating the α-acyloxyacrylic acid ester from the reaction mixture.

2. A process for preparing ethyl-α-acetoxy-acrylate which comprises reacting α-acetoxy-acrylonitrile with ethyl alcohol in the presence of anhydrous hydrogen chloride to produce α-acetoxy-β-chloropropionoimino ethyl ether hydrochloride, adding water to hydrolyze the α-acetoxy-β-chloropropionoimino ethyl ether hydrochloride to ethyl-α-acetoxy-β-chloropropionate, adding an organic tertiary amine and refluxing the mixture to produce ethyl-α-acetoxyacrylate represented by the formula:

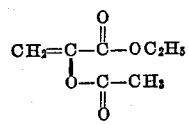

and separating the ethyl-α-acetoxyacrylate from the reaction mixture.

3. A process for preparing ethyl-α-acetoxyacrylate which comprises reacting α-acetoxy-acrylonitrile with ethyl alcohol in the presence of anhydrous hydrogen chloride to produce α-acetoxy-β-chloropropionoimino ethyl ether hydrochloride, adding water to hydrolyze the α-acetoxy-β-chloropropionoimino ethyl ether hydrochloride to ethyl-α-acetoxy-β-chloropropionate, adding quinoline and refluxing the mixture to produce ethyl-α-acetoxyacrylate represented by the formula:

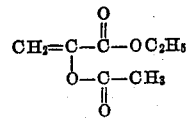

and separating the ethyl-α-acetoxyacrylate from the reaction mixture.

4. A process for preparing an α-acyloxy-β- halopropionate which comprises reacting a nitrile having the formula:

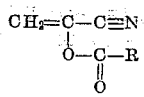

wherein R represents an alkyl group having 1 to 3 carbon atoms, with an alcohol having the formula:

$$R_1\text{—OH}$$

wherein $R_1$ is a member selected from the group consisting of an alkyl group having the formula $C_nH_{2n+1}$ wherein $n$ is a positive integer of from 1 to 8, and a mononuclear aralkyl group of the benzene series having from 7 to 10 carbon atoms, in the presence of an anhydrous hydrogen halide having the formula: HX wherein X is a halogen atom selected from the group consisting of chlorine, bromine, and fluorine atoms, hydrolyzing the α-acyloxy-β-halopropionoimino alkyl ether hydrohalide so formed by the addition of water, and separating the precipitated α-acyloxy-β-halopropionic acid ester from the aqueous solution.

5. A process for preparing ethyl-α-butyroxyacrylate which comprises reacting α-butyroxyacrylonitrile with ethyl alcohol in the presence of anhydrous hydrogen chloride to produce α-butyroxy-β-chloropropionoimino ethyl ether hydrochloride, adding water to hydrolyze the α-butyroxy-β-chloropropionoimino ethyl ether hydrochloride to ethyl-α-butyroxy-β-chloropropionate, adding an organic tertiary amine and refluxing the mixture to produce ethyl-α-butyroxyacrylate represented by the formula:

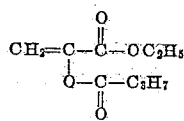

and separating the ethyl-α-butyroxyacrylate from the reaction mixture.

6. A process for preparing ethyl-α-butyroxyacrylate which comprises reacting α-butyroxyacrylonitrile with ethyl alcohol in the presence of anhydrous hydrogen chloride to produce α-butyroxy-β-chloropropionoimino ethyl ether hydrochloride, adding water to hydrolyze the α-butyroxy-β-chloropropionoimino ethyl ether hydrochloride to ethyl-α-butyroxy-β-chloropropionate, adding quinoline and refluxing the mixture to produce ethyl-α-butyroxyacrylate represented by the formula:

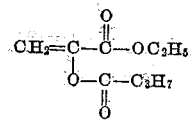

and separating the ethyl-α-butyroxyacrylate from the reaction mixture.

7. A process for preparing ethyl-α-acetoxy-β-chloropropionate which comprises reacting α-acetoxyacrylonitrile with ethyl alcohol in the presence of anhydrous hydrogen chloride, hydrolyzing the α-acetoxy-β-chloropropionoimino ethyl ether hydrochloride, so formed, by the addition of water, and separating the precipitated ethyl-α-acetoxy-β-chloropropionate from the aqueous solution.

WILLIAM O. KENYON.
CORNELIUS C. UNRUH.

REFERENCES CITED

The following references are of record in the file of this patent:

Karrer, "Organic Chemistry" 2nd edition, 1946, page 211.

Certificate of Correction

Patent No. 2,499,392 March 7, 1950

WILLIAM O. KENYON ET AL.

It is hereby certified that errors appear in the printed specification of the above numbered patent requiring correction as follows:

Column 1, lines 6 and 10, for "ketone" read *ketene*; column 2, line 45, for that portion of the formula reading "R—C=C" read *R—C=O*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*